United States Patent [19]
Bolk et al.

[11] Patent Number: 5,545,900
[45] Date of Patent: Aug. 13, 1996

[54] RADIATION ANALYSIS APPARATUS

[75] Inventors: Hendrik J. J. Bolk; Georges C. P. Zieltjens, both of Almelo, Netherlands

[73] Assignee: U.S. Philips Corporation, New York, N.Y.

[21] Appl. No.: 216,563

[22] Filed: Mar. 22, 1994

[30] Foreign Application Priority Data

Mar. 24, 1993 [EP] European Pat. Off. ............. 93200850

[51] Int. Cl.⁶ ...................................................... G01T 1/17
[52] U.S. Cl. ............................................................ 250/395
[58] Field of Search .............................. 250/395; 341/120

[56] References Cited

U.S. PATENT DOCUMENTS

| | | | |
|---|---|---|---|
| 4,352,160 | 9/1982 | Frech et al. | 364/553 |
| 4,903,023 | 2/1990 | Evans et al. | 341/120 |
| 5,304,808 | 4/1994 | Odell | 250/395 |

FOREIGN PATENT DOCUMENTS 3721101  1/1988  Germany .
3-179919  8/1991  Japan ................................. 341/120

*Primary Examiner*—Constantine Hannaher
*Attorney, Agent, or Firm*—Jack D. Slobod

[57] ABSTRACT

A radiation analysis apparatus is provided with circuitry for correcting errors in a pulse-height distribution due to differential non-linearities of the analog-to-digital converter that is employed for digitising the detector signals. Correction is performed by multiplying counts by correction factors so as to form corrected counts constituting a corrected pulse-height spectrum. Correction factors are obtained by supplying to the analog-to-digital converter a known control-measurement detector signal having a known corresponding ideal pulse-height spectrum. Comparison of the pulse-height spectrum actually formed upon supplying the control-measurement detector signal with the ideal pulse-height spectrum provides correction factors that are stored in a memory. Generator signals obtained during radiation analysis lead to counts to be corrected which are supplied to a multiplier together with respective correction factors such that corrected counts are formed constituting a corrected pulse-height distribution being supplied to a display device.

12 Claims, 3 Drawing Sheets

RADIATION ANALYSIS APPARATUS

BACKGROUND OF THE INVENTION

1. Field of the Invention

The invention pertains to a radiation analysis apparatus including a radiation detector for generating an analog detector signal, an analog-to-digital converter for converting said analog detector signal into a digital signal, and a memory to store counts which represent a pulse height distribution of said radiation.

2. Description of the Related Art

A radiation analysis apparatus of said kind is known from the German Offenlegungsschrift DE 37 21 101.

The known radiation analysis apparatus comprises a detector reading circuit incorporating a pulse-height analyzer comprising an analog-to-digital converter and a storage circuit for converting analog detector signals generated by the radiation detector into a pulse-height distribution. The digital signal from the analog-to-digital converter is supplied to the storage circuit so as to form a pulse-height distribution. Said pulse-height distribution formed in the storage circuit is displayed on a cathode ray tube. The analog-to-digital converter inevitably has to some extent differential nonlinearities, giving rise to deviations of the ideal conversion of analog signals generated by the radiation detector. In the known radiation analysis apparatus errors arising by the differential non-linearities of the analog-to-digital converter are carded over into a pulse-height distribution that is displayed on the cathode-ray tube.

SUMMARY OF THE INVENTION

It is inter alia an object of the invention to provide a radiation analysis apparatus for producing a pulse-height distribution being corrected for errors induced by differential non-linearities of the analog-to-digital converter.

This is achieved in that a radiation analysis apparatus in accordance with the invention is characterized in that said apparatus comprises a correction means to calculate said counts on the basis of said digital signal and on the basis of a correction signal which is representative for conversion-errors of the analog-to-digital converter.

When radiation is incident on the radiation detector an electronic detector signal is generated. Said detector signal is converted into a digital signal amplitude which is supplied to the storage circuit, so as to form counts in the storage circuit from a sequence of detector signals, said counts constituting a pulse-height distribution; i.e. the value of a count corresponds to the occurrence of signal amplitudes having values in a predetermined range. Errors induced in the pulse-height distribution by differential non-linearities depend only on the analog-to-digital converter employed and are notably independent of the intensities and energy distribution of the radiation detected by the x-ray detector. Therefore, when an ideal pulse-height distribution is known for any one known detector signal, values for correction numbers can be established by comparing the counts of the ideal pulse-height distribution to counts formed from the primary digital amplitude. The correction numbers are subsequently employed for correcting any pulse-height distribution formed from the detector signal by calculation of corrected counts constituting a corrected pulse height distribution.

A preferred embodiment of a radiation analysis apparatus in accordance with the invention is characterised in that the correction means comprises multiplication means for multiplying counts derived from said digital signal by the correction signal.

In the present embodiment of a radiation analysis apparatus in accordance with the invention a pulse-height distribution is formed from primary digital signal amplitudes by way of a storage circuit having the form of a multi-channel analyzer incorporating a multi-channel memory. A channel number of the multi-channel memory corresponds to a narrow range of values for digital signal amplitudes. Tendering one primary digital signal amplitude to the multi-channel analyzer has as an effect that a value of a count stored in a relevant channel of the multi-channel memory is increased by one incremental unit; the relevant channel being in correspondence with the digital signal amplitude. Correspondingly, a channel number of the multi-channel memory corresponds to a narrow range of energies of radiation quanta detected by the radiation detector. Supplying a sequence of detector signals to the analog-to-digital converter causes formation of counts in the multi-channel memory. The pulse-height distribution so formed in the multi-channel memory comprises errors due to differential nonlinearities of the analog-to-digital converter. By computation employing correction numbers, the counts from the multi-channel memory can be formed into corrected counts constituting a corrected pulse-height distribution not containing errors due to said differential non-linearities. The corrected pulse-height distribution is e.g. registered by a recording device or displayed by a display device.

A further preferred embodiment of a radiation analysis apparatus in accordance with the invention is characterised in that the correction means comprises multiplication means for multiplying said digital signal by the correction signal.

Instead of correcting counts comprising errors, a corrected pulse-height spectrum is obtained from the multi-channel memory of a present embodiment of a radiation analysis apparatus. Errors due to differential non-linearities of the analog-to-digital converter in digital signal amplitudes are corrected for by way of computation of corrected digital signal amplitudes from said digital signal amplitudes and correction numbers. Correspondingly, supplying said corrected digital signal amplitudes to the multi-channel memory leads to formation of corrected counts in respective channels of the multi-channel memory and therefore to formation of a corrected pulse-height spectrum.

A further preferred embodiment of a radiation analysis apparatus in accordance with the invention is characterised in that the correction means comprises a memory device for storing values of signal amplitudes of the correction signal.

Correction numbers being independent of the detector signal have values determined by comparing a pulse-height distribution to an ideal pulse-height distribution being known to correspond to a known detector signal. Therefore, values of correction numbers having been determined are stored in a memory device and are conveniently supplied from said memory device.

A further preferred embodiment of a radiation analysis apparatus in accordance with the invention is characterised in that values for the correction numbers are obtained by supplying a control-measurement signal of a predetermined shape to the analog-to-digital converter and comparing an ensuing pulse-height distribution to an ideal pulse-height distribution corresponding to said known signal.

Correction numbers for correcting a pulse-height distribution are independent of detector signals. Thus, correction numbers are conveniently obtained by supplying to the analog-to-digital converter a control-measurement detector signal of a predetermined shape having a range of signal amplitudes. From said known control-measurement detector signal calibration counts constituting a calibration pulse-height distribution is formed in the storage circuit. The control-measurement detector signal being known corresponds to a known ideal pulse-height spectrum being formed of ideal counts. From said ideal counts and said calibration counts correction numbers are obtained by calculation. The correction numbers obtained for correcting the known calibration pulse-height spectrum corresponding to the known control-measurement detector signal are equally valid for correcting any detector signal having signal amplitudes in the range of signal amplitudes of the control measurement detector signal, obtained when carrying out radiation analysis with a radiation analysis apparatus according to the invention.

A further preferred embodiment of a radiation analysis apparatus in accordance with the invention is characterised in that the control-measurement signal is a sawtooth shaped signal.

For obtaining an adequate set of correction numbers, the control-measurement detector signal should both comprise a relevant range of signal amplitudes and as well correspond to a comparatively simple ideal pulse-height distribution. A signal having a sawtooth form satisfies both these conditions and is therefore particularly suitable for use as a control-measurement detector signal.

The various functions which the radiation analysis apparatus according to the invention performs for carrying-out corrections for producing a pulse-height distribution being corrected for errors induced by differential non-linearities of the analog-to-digital converter are preferably performed in by a suitably programmed computer coupled to said apparatus.

BRIEF DESCRIPTION OF THE DRAWINGS

These and other aspects of the invention will become apparent from and elucidated with reference to the embodiments described hereinafter and with reference to the accompanying drawings, wherein.

DETAILED DESCRIPTION OF THE PREFERRED EMBODIMENTS

Figure 1:
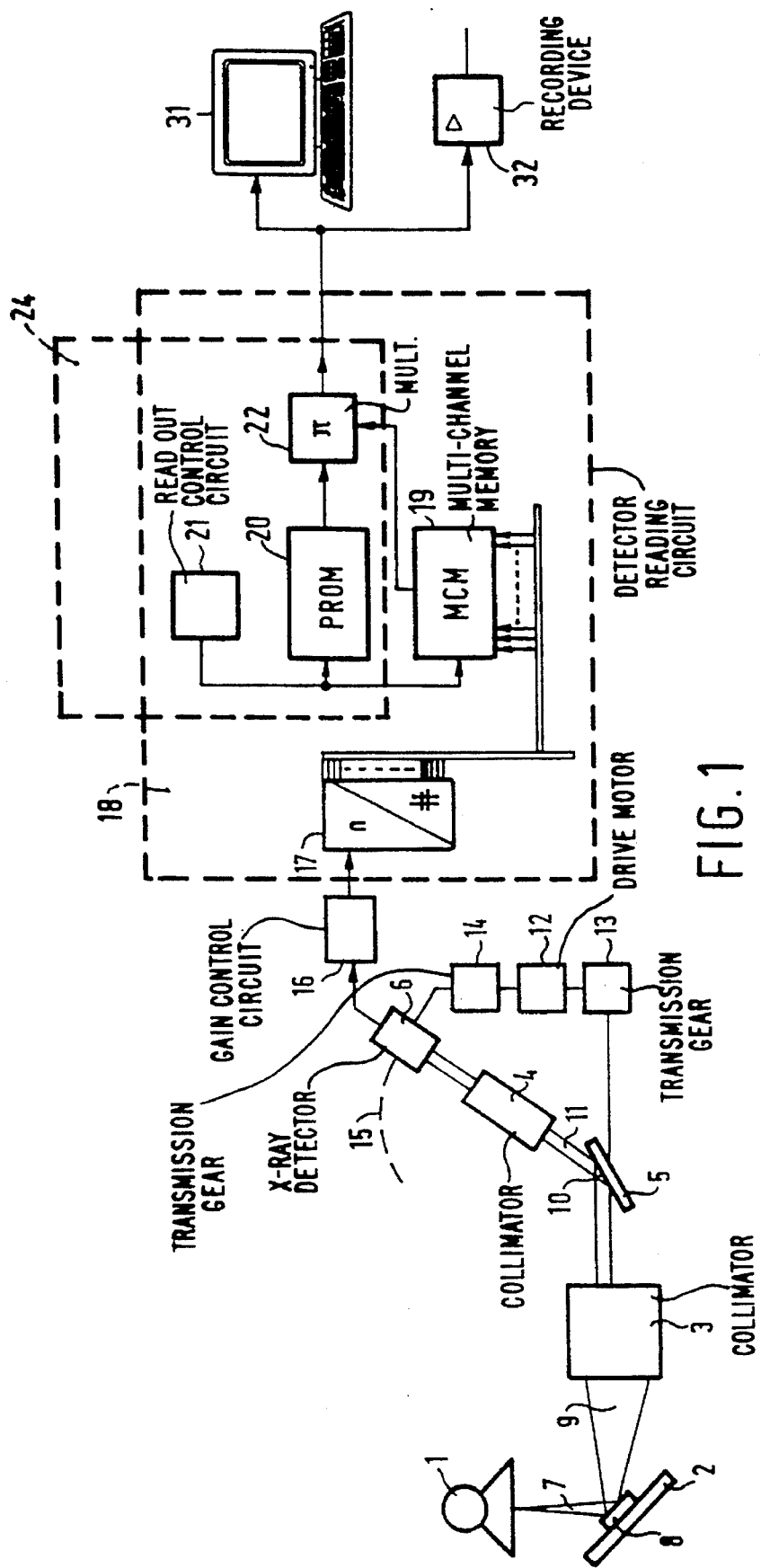
FIG. 1 shows an embodiment of a radiation analysis apparatus in accordance with the invention.

FIG. 1 shows an embodiment of a radiation analysis apparatus in accordance with the invention. In fact, the radiation analysis apparatus as shown in FIG. 1 is in particular an x-ray analysis apparatus.

The x-ray analysis apparatus shown in FIG. 1 comprises an x-ray source 1, a sample holder 2, collimators 3 and 4, an analyzing crystal 5 and an x-ray detector 6. The x-ray detector 6 is for instance a gas ionisation detector. An x-ray beam 7 is incident on a sample 8 and causes x-ray fluorescence to be emitted by the sample. A fluorescence x-ray beam 9 is incident via the collimator 3 on a surface 10 of the analyzing crystal 5, after which a further x-ray beam 11 reflected according to Bragg reflection therefrom reaches the x-ray detector 6 via the collimator 4. By way of a drive motor 12 and a transmission gear 13 the analyzing crystal is at option rotated about an axis perpendicular to the plane of the drawing. By means of this rotation, the energy of the x-ray beam incident on the x-ray detector is selected within a narrow range. The motor 12, acting via a transmission gear 14, causes a rotation of the detector which matches the rotation of the crystal, likewise about an axis at right angles to the plane of the drawing. Due to this rotation, the detector is moved along an are of a circle 15. The analog detector signal generated by the detector is controlled by a gain-control-circuit 16. Subsequently said detector signal is converted into a digital signal amplitude by an analog-to-digital converter 17. The signal amplitude of the detector signal generated by the detector is in correspondence with an energy of an x-ray photon incident on the detector. Thus, a distribution of occurrence of amplitudes of signals generated by the detector corresponds to an energy distribution of x-ray photons incident on the detector. Said occurrence distribution of amplitudes of signals will be referred to hereinafter as a pulse-height distribution, which is displayed on e.g. a cathode-ray tube of a monitor 31 in the form of a histogram. The analog detector signal generated by the radiation detector 6 is processed by detector reading circuit 18 that will be further discussed hereinafter.

For achieving high-speed operation of the detector reading circuit, the analog-to-digital converter 17 is a Flash-ADC. A storage circuit having the form of a multi-channel-memory 19, which is a part of a multi-channel-analyzer, is provided for converting detector signals generated by the detector into a pulse-height distribution. A channel number of the multi-channel memory corresponds to a narrow range of values for signal amplitudes of detector signal amplitudes generated by the detector; the width of said range being determined by the ratio of a predetermined width of a range of x-ray energies relevant for performing an x-ray analysis to a number of channels of the multi-channel memory. Supplying one digital signal to the multi-channel memory has as an effect that a value stored in a relevant channel of the multi-channel memory is increased by one incremental unit, the relevant channel being in correspondence with the value of the detector signal amplitude generated by the detector. Supplying a sequence of detector signals to the analog-to-digital converter causes formation of counts in the multi-channel memory. Correspondingly, a channel number of the multi-channel memory corresponds to a narrow range of values of energies of x-ray photons detected by the x-ray detector.

Because a Flash-ADC inevitably has to some extent differential non-linearities, perturbations are carried over into the pulse-height distribution as registered by the multi-channel-memory 19. Such perturbations entirely due to intrinsic differential non-linearities are corrected for in a radiation analysis apparatus in accordance with the invention. It is known per se from the U.S. Pat. No. 4 352 160 that differential lineafity, or the extent of differential non-linearity, of an analog-to-digital converter can be measured by applying a known test pulse to the analog-to-digital converter. A similar method is employed in a radiation analysis apparatus in accordance with the invention, however for calibrating and subsequently correcting a pulse-height distribution registered by the multi-channel-memory, instead of for merely analyzing the analog-to-digital converter. For correcting, correction numbers are employed that are obtained by carrying-out a control-measurement of the Flash-ADC. Calibration of the detector reading circuit means can be carried out while the detector reading circuit is either detached from or connected to the radiation analysis apparatus. Calibration is performed by supplying an analog control-measurement sawtooth-signal to the Flash-ADC, said control-measurement sawtooth signal being accurately linear in the range of the Flash-ADC and converting said analog saw-tooth signal into a digital control-measurement signal at a high clock frequency by the Flash-ADC. Specifically the sawtooth-signal is chosen such that the range of the Flash-ADC is amply comprised within the interval between a maximum signal amplitude and a minimum signal amplitude of the control-measurement sawtooth-signal. Therefore, when supplying the digital control-measurement signal to the multi-channel memory, a substantial number of counts are supplied to the underflow and to the overflow channels and counts corresponding to the intermediate range of the control-measurement sawtooth signal are supplied to intermediate channels wherein the pulse-height distribution is formed. As a consequence, a portion of the control-measurement sawtooth signal having an accurate linearity is employed for calibration. Ideally, when supplying the control-measurement sawtooth signal to the Flash-ADC, equal numbers of counts are supplied to the intermediate channels of the multi-channel-memory. For a 256-channel multi-channel memory, wherein the underflow channel is channel #0 and the overflow channel is channel #255, the ideal number of counts $N'_c$ is given by $$N'_c = (1/254) \sum_{i=1}^{254} N_c(i)$$

where $N_c(i)$ is the number of counts obtained in channel #i after supplying the digital control-measurement signal to the multi-channel memory means. Then correction factors $c(i)$ for each of the channels are obtained as $$c(i) = N'_c/N_c(i).$$

The values of the calibration factors for each of the channels of the multi-channel memory are stored in a memory-device 20, notably a programmable memory.

When a radiation analysis is performed and a pulse-height distribution is stored in the multi-channel-memory 19, the correction factors stored in the memory-device 20 are employed for supplying a corrected pulse-height distribution to the monitor 31 or to a recording device 32. To that end, a read-out control-circuit 21 is provided for reading out successive channels of the multi-channel-memory 19 and reading out a relevant correction factor from the memory-device 20. Therefore, the memory-device 20 with the control-circuit 21 forms means for providing correction numbers. A number of counts read from channel #i, say $N_m(i)$ is supplied to a computation means having the form of a multiplier 22 together with a corresponding correction factor for the same channel $c(i)$. By the multiplier 22 a corrected number of counts $N_d(i)$ is computed, viz.

$$N_d(i) = N_m(i) * c(i).$$

Finally, the corrected number of counts form a corrected pulse-height distribution that is supplied to the monitor 31, possibly a monitor of a computer being connected to the radiation analysis apparatus, or the recording device 32. The functions of storage of correction numbers, multiplication and read-out control for which separate devices are shown can also be combined, as shown in box 24, in the functions of a computer being programmed to that end.

Figure 2:
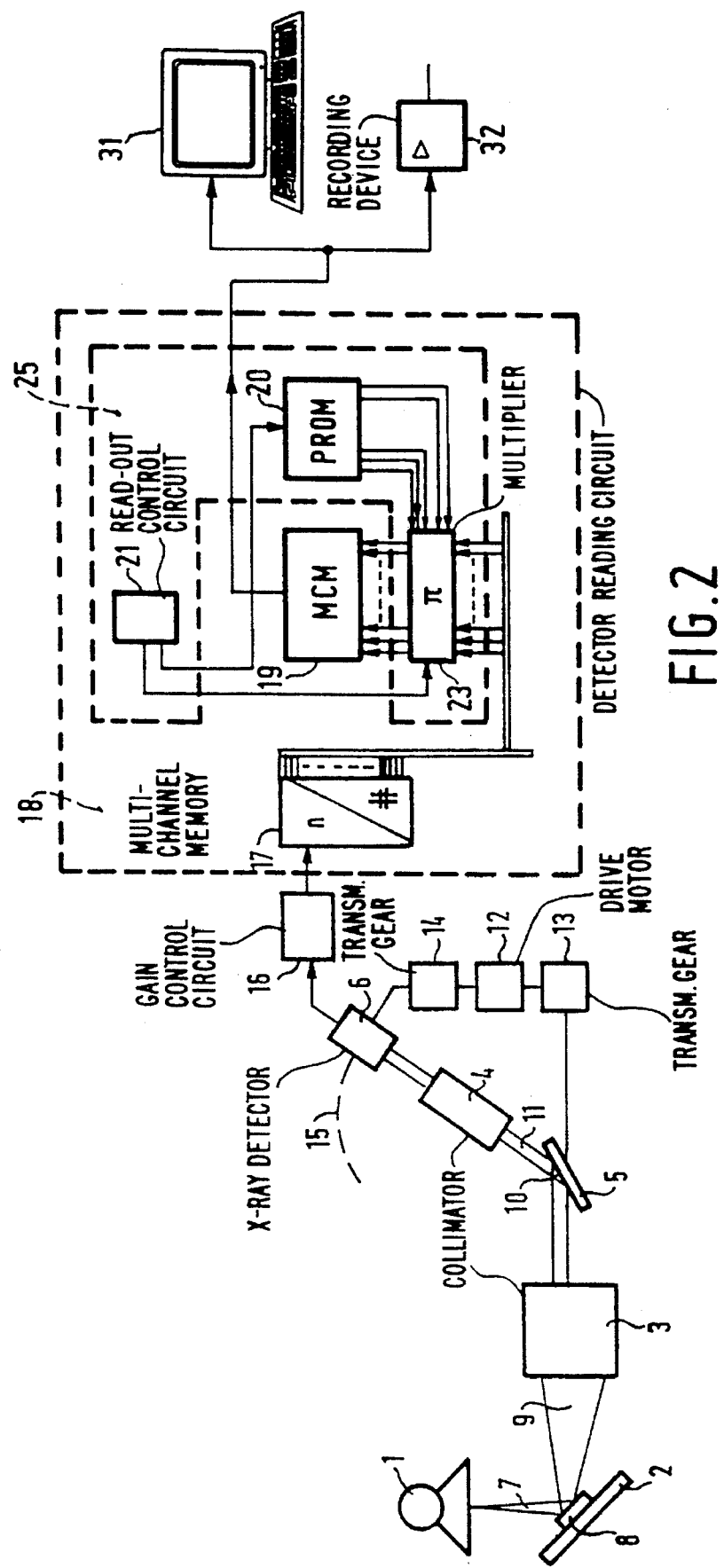
FIG. 2 shows another embodiment of a radiation analysis apparatus in accordance with the invention.

FIG. 2 shows another embodiment of a radiation analysis apparatus in accordance with the invention. In an alternative embodiment as shown in FIG. 2, of a radiation analysis apparatus in accordance with the invention, multiplication is carried out in that digital signals from the Flash-ADC 17 are separately multiplied by corresponding correction factors by way of a multiplier 23. In that way, contents of relevant channels of the multi-channel-memory 19 are increased by incremental units fractional amounts, rather than unity, so as to form a corrected pulse-height distribution in the multi-channel memory. Upon reading out the multi-channel-memory 19, a corrected pulse-height distribution is supplied to the monitor 31 or to the recording device 32. The functions of storage of correction numbers, multiplication and read-out control for which separate devices are shown can also be combined, as shown in box 25, in the functions of a computer being programmed to that end.

Figure 3:
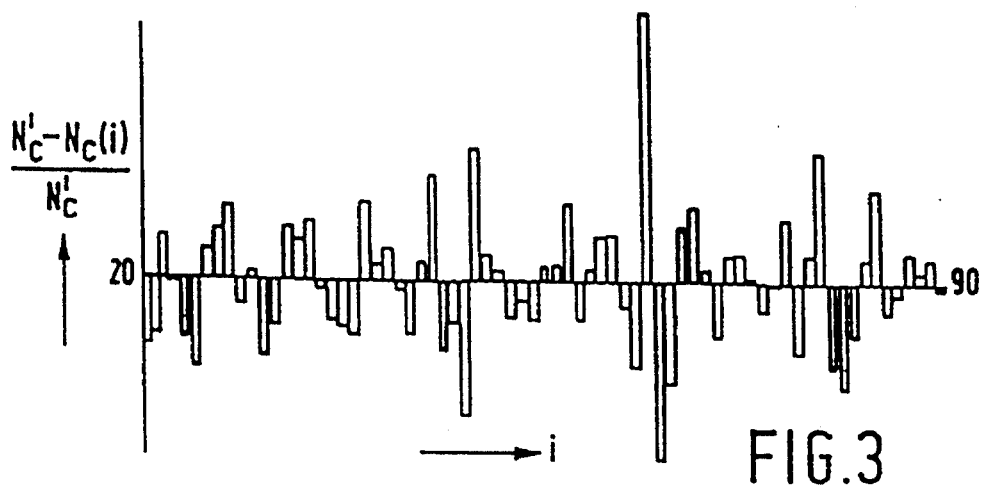
FIG. 3 shows differential non-linearities of an analog-to-digital converter for use in a radiation analysis apparatus in accordance with the invention.

FIG. 3 shows differential non-linearities of an analog-to-digital converter for use in a radiation analysis apparatus in accordance with the invention. In particular, for channels #20 to channel #90 the relative deviations from ideal behaviour of the analog-to-digital converter 17 are shown.

Figure 4A:
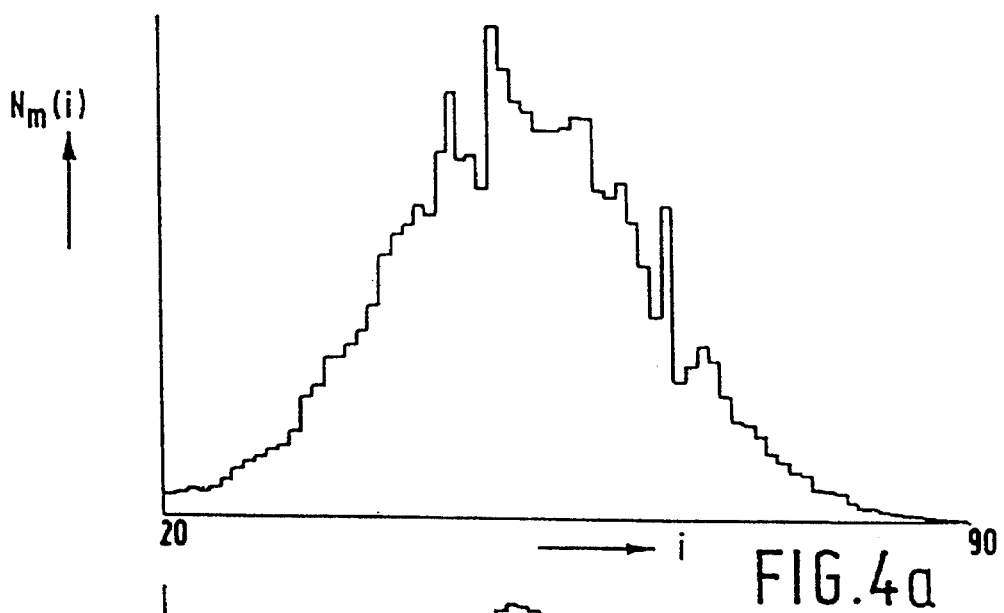
FIG. 4a shows an example of a pulse-height distribution comprising deviations due to the differential non-linearities of an analog-to-digital converter shown in FIG. 3, said pulse-height distribution pertaining to a detector signal having a Gaussian-shaped pulse-height distribution.

FIG. 4a shows an example of a pulse-height distribution comprising deviations due to the differential non-linearities of an analog-to-digital converter shown in FIG. 3, said pulse-height distribution pertaining to a detector signal having a Gaussian-shaped pulse-height distribution. When a detector signal having a Gaussian-shaped pulse-height distribution is supplied to a detector reading circuit lacking correction means for differential non-linearities of the analog-to-digital converter a distorted pulse-height distribution is obtained. As appears from FIG. 4a, strong deviations from Gaussian behaviour are present for those channels having strong relative deviations shown in FIG. 3.

Figure 4B:
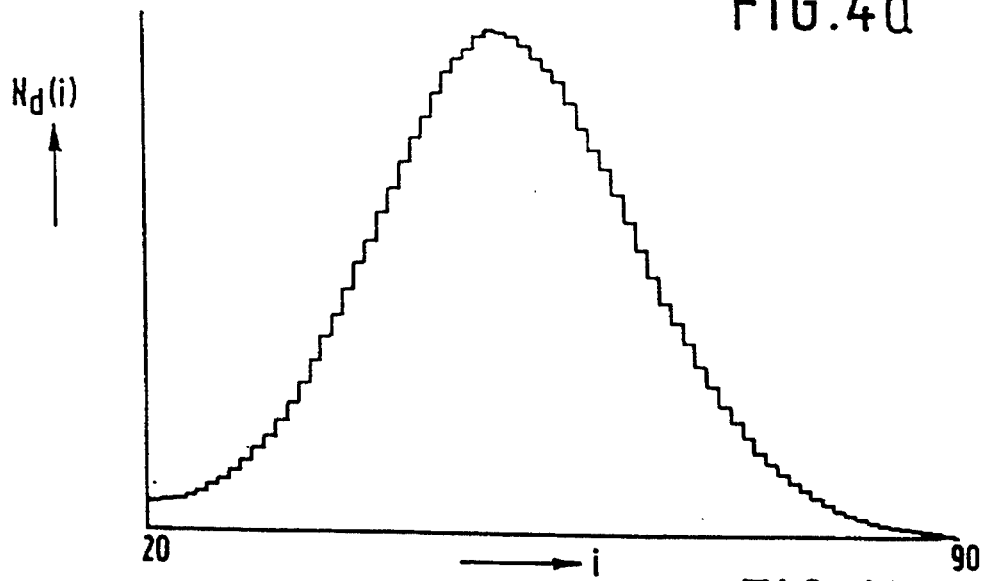
FIG. 4b shows an example of a pulse-height distribution pertaining to the above detector signal from which deviations have due to differential non-linearities of an analog-to-digital converter shown in FIG. 3 have been removed as produced by a radiation analysis apparatus according to the invention.

FIG. 4b shows an example of a pulse-height distribution pertaining to the above detector signal from which deviations due to differential non-linearities of an analog-to-digital converter shown in FIG. 3 have been removed, as produced by a radiation analysis apparatus according to the invention. As appears from FIG. 4b, a detector reading circuit of a radiation analysis apparatus in accordance with the invention produces a correct pulse-height distribution comprising counts being corrected for differential non-linearities of the analog-to-digital converter 17.

We claim:

1. A radiation analysis apparatus for producing a pulse-height distribution comprising:

a radiation detector for generating an analog detector signal in the form of detector pulses, an analog-to-digital converter for converting said analog detector signal into a digital signal having signal amplitudes indicative of the heights of the detector pulses, a memory means provided with individual channels corresponding to different ranges of signal amplitudes of the digital signal, and each time a detector pulse occurs a content of the channel corresponding to the range in which the signal amplitude of the digital signal lies is increased by one incremental unit, thereby generating a stored count for each channel, and a correction means to calculate per channel a corrected count on the basis of a correction signal having an individual signal amplitude for each channel which is representative of conversion-errors of the analog-to-digital converter applicable to the channel.

2. A radiation analysis apparatus as claimed in claim 1, wherein the correction means comprises multiplication means for multiplying the counts per channel by the individual signal amplitude of the correction signal applicable to the channel.

3. A radiation analysis apparatus as claimed in claim 2, wherein the correction means comprises a memory device for storing values of signal amplitudes of the correction signal.

4. A radiation analysis apparatus as claimed in claim 3, wherein the memory device is provided with the signal amplitudes of the correction signal which are obtained by supplying a control-measurement signal representing an ideal pulse-height distribution to the analog-to-digital converter and comparing the pulse-height distribution resulting from the analog-to-digital converter to the ideal pulse-height distribution.

5. A radiation analysis apparatus as claimed in claim 4, wherein the control-measurement signal is a saw-tooth shaped signal.

6. A radiation analysis apparatus as claimed in claim 1, wherein the correction means comprises means for correcting the incremental unit applicable to the channel corresponding to the range in which the signal amplitude of the digital signal lies in response to the individual signal amplitude of the correction signal applicable to the channel.

7. A radiation analysis apparatus as claimed in claim 6, wherein the correction means comprises a memory device for storing values of the signal amplitudes of the correction signal.

8. A radiation analysis apparatus as claimed in claim 7, wherein the memory device is provided with the signal amplitudes of the correction signal which are obtained by supplying a control-measurement signal representing an ideal pulse-height distribution to the analog-to-digital converter and comparing the pulse-height distribution resulting from the analog-to-digital converter to the ideal pulse-height distribution.

9. A radiation-analysis apparatus as claimed in claim 8, wherein the control-measurement signal is a saw-tooth shaped signal.

10. A radiation analysis apparatus as claimed in claim 1, wherein the correction means comprises a memory device for storing values of the signal amplitudes of the correction signal.

11. A radiation analysis apparatus as claimed in claim 10, wherein the memory device is provided with the signal amplitudes of the correction signal which are obtained by supplying a control-measurement signal representing an ideal pulse-height distribution to the analog-to-digital converter and comparing the pulse-height distribution resulting from the analog-to-digital converter to the ideal pulse-height distribution.

12. A radiation analysis apparatus as claimed in claim 11, wherein the control-measurement signal is a saw-tooth shaped signal.

* * * * *